No. 872,651. PATENTED DEC. 3, 1907.
I. GORDON.
HAY AND GRAIN LOADER.
APPLICATION FILED JUNE 24, 1907.
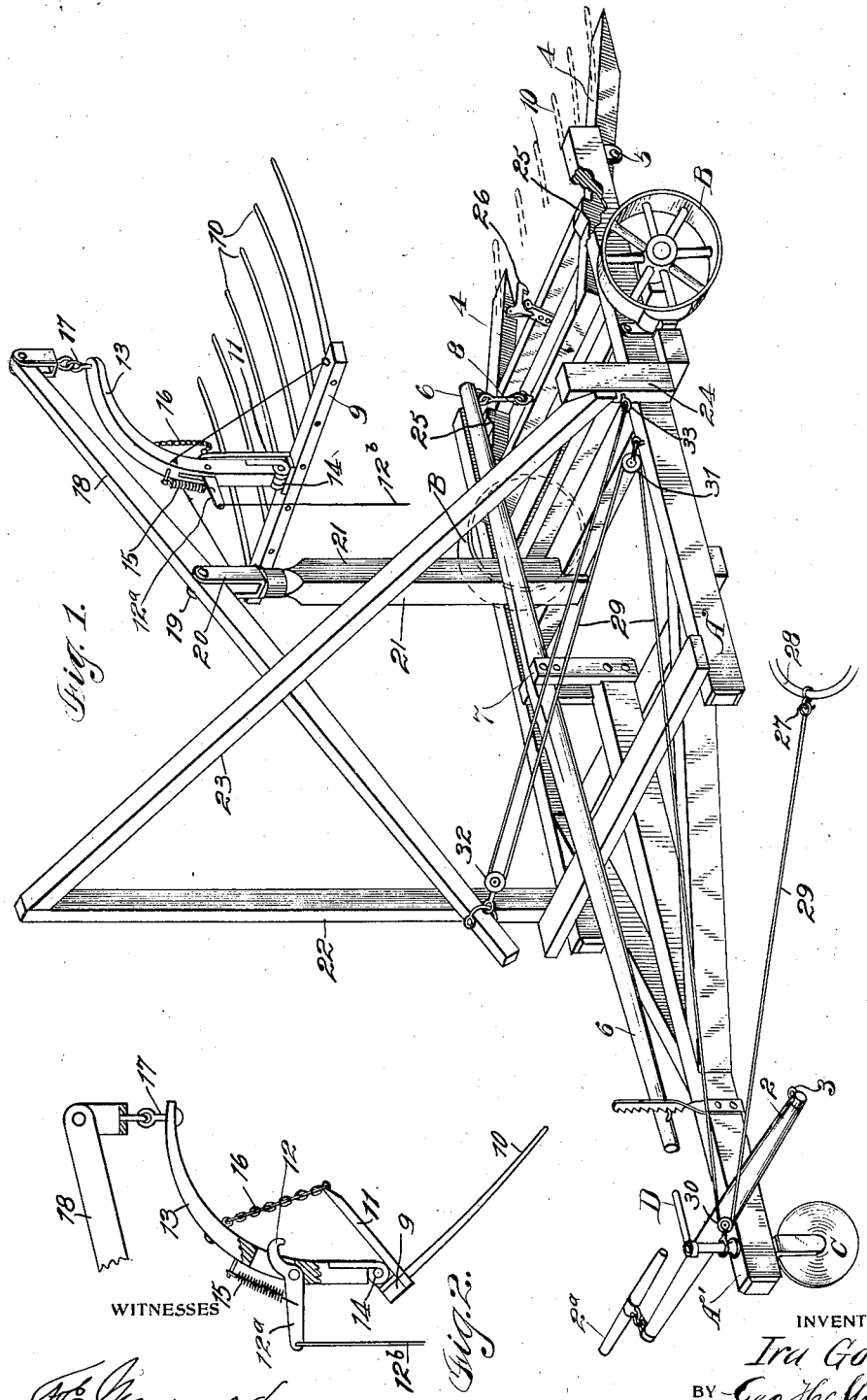
WITNESSES
INVENTOR:
Ira Gordon;
BY
ATTORNEY

UNITED STATES PATENT OFFICE.

IRA GORDON, OF DAVISVILLE, CALIFORNIA.

HAY AND GRAIN LOADER.

No. 872,651.   Specification of Letters Patent.   Patented Dec. 3, 1907.

Application filed June 24, 1907. Serial No. 380,514.

*To all whom it may concern:*

Be it known that I, IRA GORDON, citizen of the United States, residing at Davisville, in the county of Yolo and State of California, have invented new and useful Improvements in Hay and Grain Loaders, of which the following is a specification.

My invention relates to a traveling apparatus which is designed for gathering hay or grain and transferring it to wagons, stacks or other points outside the line of travel of the machine.

It consists in a combination of parts and in details of construction which will be more fully explained by reference to the accompanying drawings, in which—

Figure 1 is a perspective view of my apparatus. Fig. 2 is a detail of the fork controlling mechanism.

It is the object of my invention to combine in a single apparatus, a rake or means by which any product, such as hay or grain, may be collected from the ground where it lies, and by afterwards disengaging the rake or fork from the main apparatus, to raise and transfer it and its load to a point at one side of the main portion of the machine, and by detaching means to discharge the load into a wagon which is driven by the side of the machine, or upon a stack, or into separate interspaced cocks or piles.

As shown in the drawing, A is a frame having bearing wheels B near the front, and a steering wheel C journaled upon a vertical turnable stem or standard at the rear end of the beam A' which extends to the rear of the main frame A. By means of a handle D the machine may be steered in any desired direction.

2 and 2ᵃ are respectively a double and a swingletree, the latter being carried upon one end of the doubletree and serving for the connection of a draft animal. The other end of the doubletree has a link 3 to which a second draft animal may be attached to assist in propelling the machine while traveling, and from which he may be disengaged for a purpose to be hereafter described.

To the front of the main frame a supplemental frame 4 is pivoted, as shown at 5. This frame has its side bars projecting to the front beyond the main frame, as shown, and by means of a lever 6 fulcrumed to the main frame, as at 7, the driver and operator, who stands upon a platform just in front of the steering lever D, can move the lever 6 up or down. This lever is connected by a link 8 with the frame 4 so that by the movement of the lever the frame is tilted to raise the forward end from the ground, or to let it down to a position near the ground.

9 is a rake and fork head having teeth 10 projecting forwardly therefrom. From the center of this head a post 11 extends upwardly, and its upper end is provided with means for the engagement of a hook 12 formed at the head of a lever 12ᵃ, which is fulcrumed to a curved bar 13, the lower end of which bar is swiveled to the rake head 9, as shown at 14, so that when this dual rake and fork head is turned to bring the teeth into a gathering and loading position the upper end of the post 11 will engage with the hook 12, being held in engagement by means of a spring 15 connecting the lever 12ᵃ with a point of attachment upon the curved arm 13, as shown.

16 is a chain having one end connected with the arm 13 and the other with the upper end of the post 11, and this chain limits the drop of the fork when the latter has been disengaged to discharge its load. The upper end of the arm 13 is connected by a swivel link 17 with the upper end of a long lever 18, from which it is freely suspended. This long lever 18 is pivoted at 19 to a yoke 20 which is turnably mounted upon a post 21, which post is carried upon a cross-bar of the main frame, and may be suitably supported by braces from its upper part to the main frame, but which for sake of clearness are not here shown. 22 is a post similarly supported from the rear portion of the main frame, and 23 is a diagonally disposed bar extending from the top of the post 22 to a post 24 fixed to the main frame at the opposite side and in advance of the post 22, as clearly shown. This bar 23 serves as a guide for the lever 18, which passes beneath the bar 23 and is slidable upon it while the fork is being raised and turned to one side.

Upon the side bars of the tilting frame 4 are fixed blocks or stops 25, and 26 is a latch adapted to engage the fork or rake head 9 when the latter is in position for gathering material from the ground.

The operation of the device will then be as follows: The rake head 9, resting upon the side bars of the pivoted tilting frame 4 and in contact with the stops 25, the hook latch 26 is caused to engage with the front portion of the head 9, thus holding it firmly in place upon the tilting frame 4; and the rake head being latched to the arm 13 will then be in such position that the teeth project in advance of the side bars of the frame 4. By means of the fulcrumed lever 6 the rear portion of the frame 4 may be raised until the points of the rake teeth are sufficiently near the ground to insure the proper gathering of the material while the machine is advancing.

When a load has been collected the machine may be stopped and the draft animal which is connected with the link 3 of the doubletree may be disengaged therefrom. As a convenient means for this connection I have shown a hook 27 attached to the shafts or draft bar 28, in which the animal is harnessed, and this hook will engage with the link 3 while the animal is doing its share of the pulling. When disengaged therefrom and driven ahead, the following action will take place: 29 is a rope having one end fastened to the draft connection 28, extending thence back and around a direction pulley 30 near to the steering post, thence extending forward around another direction pulley 31 carried upon the frame A, thence extending to a direction pulley 32 upon the inner or lower end of the fork carrying lever 18, and thence to a point of permanent attachment upon the main frame or the post 24, as shown at 33.

It will be manifest that any multiplication of power may be provided by increasing the number of blocks and pulleys and different arrangements of the same, but I have found the one here described as being substantially sufficient for the work.

While the draft animal is in position to connect with the doubletree, the rope 29 will be slackened. The end of the lever 18 with which the rope is connected will stand in position near the junction of the inclined bar 23 and the post 22. The opposite end of the lever 18 will be depressed, so that by means of the loose link and swivel connection 17 the head 9 of the rake may be placed upon the side bars of the frame 4 and abutting against the stops 25, and the hook 26 being then thrown forward will engage the front and center of the rake head 9, and thus lock it in place.

It will be manifest that various means for conveniently locking and disengaging the rake head with relation to the frame 4 may be adopted without altering the character of my invention. When in this position the team being driven and the machine moving ahead the rake will collect and load. When fully loaded the team is stopped, and the latch 26 disengaged from the head by any suitable or convenient connection, not here shown. The animal connected with the doubletree at 3 is disengaged therefrom and driven ahead. The action of the rope 29 through its direction pulleys, and the pull upon the lever 18 will disengage the rake and lift the load, and from the frame 4 the curvature of the suspending arm 13 is such that the rake will maintain a position with the teeth upturned so as to retain the load, in which condition it becomes a fork, so termed. As the draft upon the rope continues, the lever arm 18 will be caused to slide against the lower part of the guide bar 23, moving from the upper end down to a point near its lower connection with the post 24; and by reason of the swivel yoke 20 on the top of the post 21, and this inclined guide, the outer end of the lever 18 carrying the fork will be caused to rise, and at the same time turned upon its bearings on the post 20 until the fork has been swung clear of the machine and sufficiently to one side to discharge its load into any proper receptacle, as a wagon driven alongside, or to form a stack or piles, if so desired. By means of a latch rope $12^b$ the latch 12 may now be disengaged and the fork will swing about its suspending points in the manner usual to such apparatus, and the load will then be discharged. The fork may be returned to its position as a rake and again latched to the arm 13 after the load has been discharged, and at or previous to the time when it is again returned to the frame 4, and it thus becomes alternately a gathering rake and a lifting fork.

Having thus described my invention, what I claim and desire to secure by Letters Patent is—

1. In an apparatus for gathering and transferring hay and like material, a main wheeled frame with steering means, a supplemental frame pivoted to the front of the main frame, means by which said supplemental frame may be tilted, stops and latching mechanism carried by said frame, a gathering implement, and a guided movable lever arm from which the implement is suspended.

2. In an apparatus for gathering and transferring hay and like material, a main wheeled steerable frame, a supplemental frame tiltably pivoted and extending at the front of the main frame, a lever by which said supplemental frame may be tilted, a rake, stops and latching means upon the tiltable frame with which said rake is engaged, a post and a lever arm pivotally fulcrumed thereon, a swivel and link connection whereby the implement is suspended from the outer end of said lever arm, a guide, and means by which said arm is moved to lower the rake and place it on the pivoted frame, or to raise it when disengaged therefrom.

3. In an apparatus of the character described, a main wheeled steerable frame, a tiltable frame pivoted thereto and projecting to the front, a rake having a head, means by which the rake head is disengageably locked to the tilting frame, a guided turnable lever arm, a swivel connection with its outer end, a curved bar suspended from said swivel and to the lower end of which the rake head is pivotally connected to maintain the teeth in a load retaining position, and a holding latch by which the rake is disengaged from its suspending means to allow the load to be discharged.

4. In an apparatus of the character described, a main wheeled frame, a supplemental frame turnably pivoted to the front end of the main frame, a lever by which the supplemental frame is moved, a gathering implement, means for disengageably connecting the head of said implement with the tiltable frame, a post, a lever arm turnably fulcrumed thereon, swivel connections between the outer end of said lever arm and the implement, an inclined guide extending diagonally across the main frame and against which the implement carrying lever is slidable, a rope connected with the inner and lower end of the lever arm, direction pulleys, and connections whereby power may be applied to the lever arm to raise or lower and transfer the implement.

5. In an apparatus of the character described, including a main wheeled frame, a double-tree mounted thereon, a draft appliance, a tiltable supplemental frame, a swiveled lever arm with a gathering implement suspended from its outer end, a diagonally disposed guide for the inner end of the lever arm, a rope connected with said lever, with direction pulleys, said rope being connected with the draft appliance connected with one of the draft animals, and means for disengageably connecting said animal with the doubletree to alternately haul the wheeled frame and to elevate the gathering implement.

In testimony whereof I have hereunto set my hand in presence of two subscribing witnesses.

IRA GORDON.

Witnesses:
A. J. PLANT,
MOLLIE GORDON.